March 16, 1954
J. HARWOOD ET AL
2,672,458
SEPARATION OF TALL OIL ACIDS
Filed Feb. 8, 1952
2 Sheets-Sheet 2
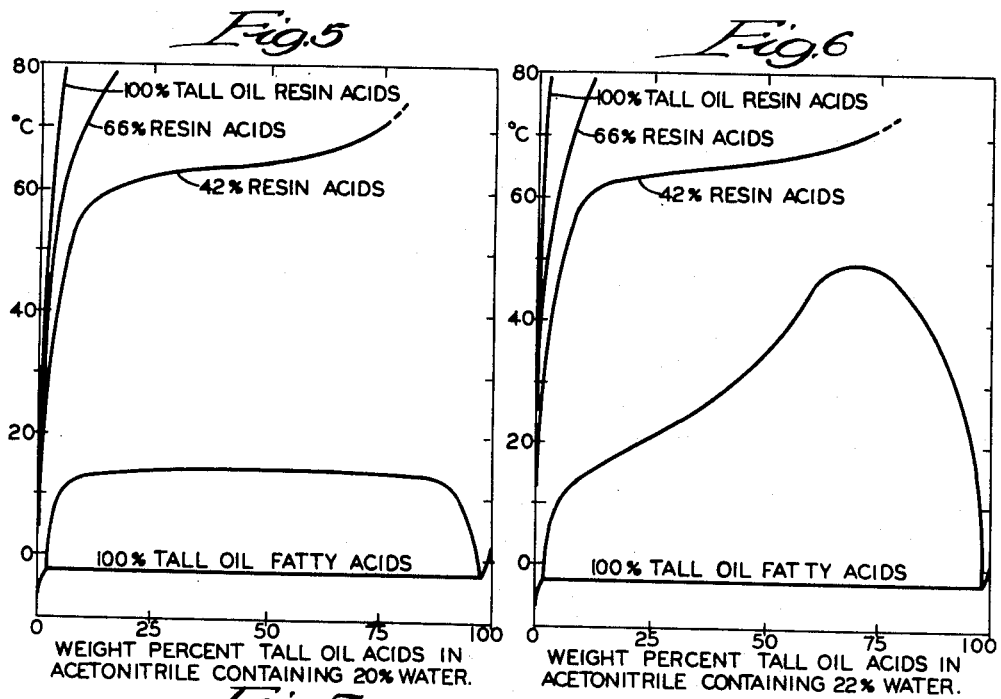
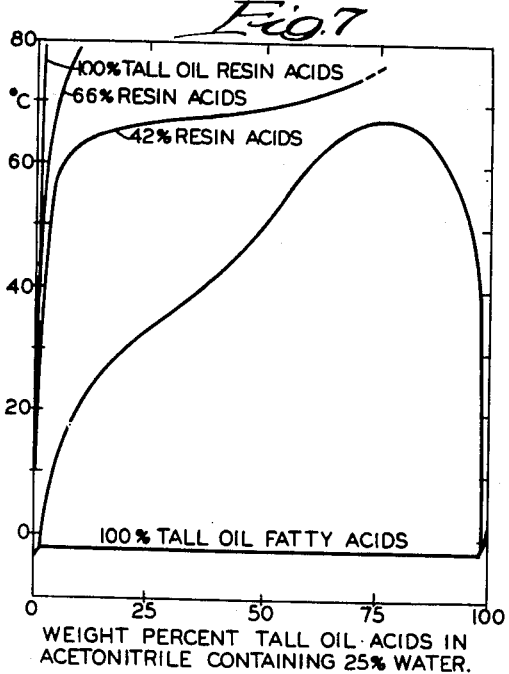

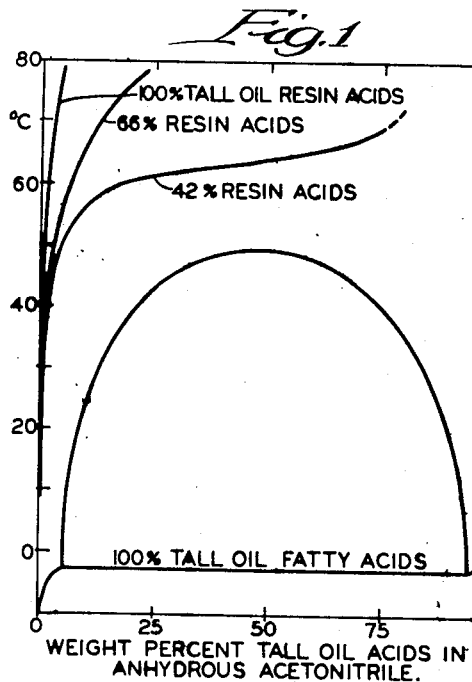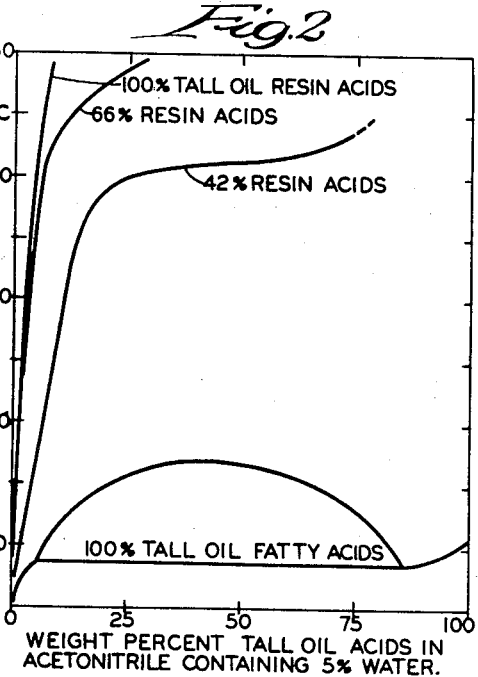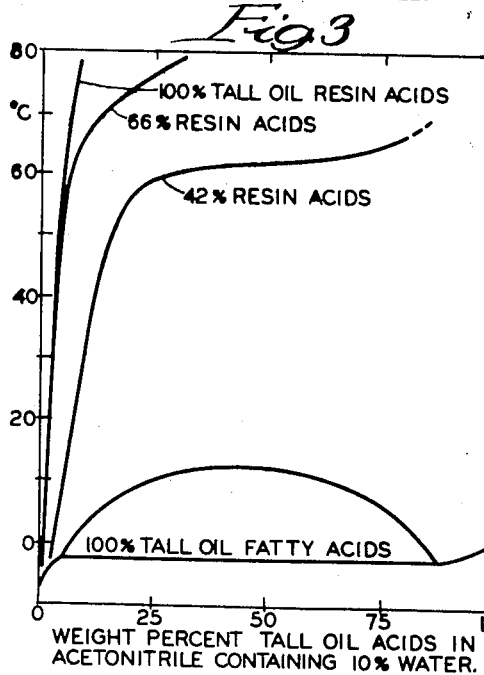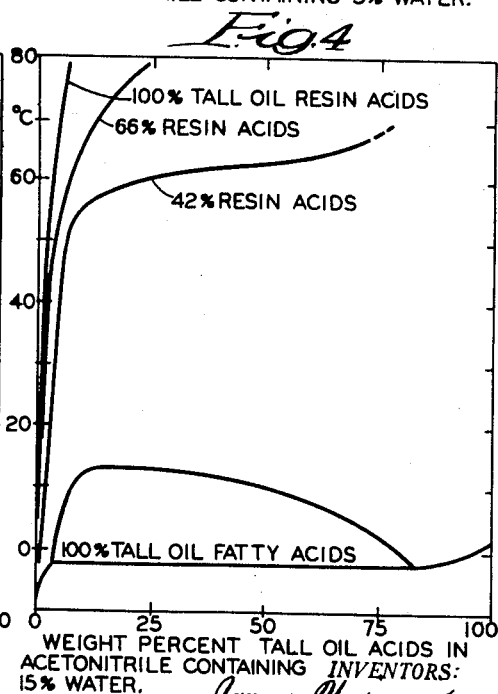

Patented Mar. 16, 1954

2,672,458

UNITED STATES PATENT OFFICE 2,672,458

SEPARATION OF TALL OIL ACIDS

James Harwood, Western Springs, and Charles W. Hoerr and Richard A. Reck, Chicago, Ill., assignors to Armour and Company, Chicago, Ill., a corporation of Illinois Application February 8, 1952, Serial No. 270,688

11 Claims. (Cl. 260—97.6)

This invention relates to the separation of tall oil acids, and more particularly to the separation of the resin acids in tall oil from the unsaturated fatty acids by solvent crystallization.

Crude tall oil is obtained commercially mainly as a by-product in sulfate wood pulp digestion. It consists primarily of resin acids and fatty acids. More specifically, tall oil consists of 10 to 60% resin acids, 20 to 60% fatty acids, and 5 to 24% unsaponifiable material such as higher alcohols and the like. The composition ordinarily encountered in industry is about 10 to 20% unsaponifiable material with the remainder consisting of approximately equal quantities of resin acids and fatty acids, the latter consisting of about equal amounts of oleic and linoleic acids. Refined or distilled tall oil has the unsaponifiable material removed. This can easily be accomplished by vacuum distillation, the acids being distilled off, leaving the unsaponifiable material in the distillation residue. The distilled tall oil acids commonly consist of 40 to 70% resin acids, the remainder being oleic and linoleic acids in approximately equal amounts. Both crude and refined tall oil are excellent inexpensive sources of resin and fatty acids. However, for a number of important uses of these acids, it is desired to employ the resin acids and fatty acids separately. Heretofore, the processes for separating the fatty acids from the resin acids in crude or refined tall oil have been relatively expensive and difficult to carry out. Both solvent extraction and solvent crystallization processes with all solvents which have been previously known have required either heating or refrigerating during the separation process, and it has been impossible to obtain anything approaching a complete separation of the resin acids from the fatty acids in one extraction or crystallization.

It is therefore an object of this invention to provide a solvent crystallization process for separating the resin acids from the fatty acids in tall oil which can be carried out at room temperature without either heating or cooling the crystallization mixture. It is a further object of this invention to provide a solvent crystallization process in which the resin acids can be substantially completely precipitated from the fatty acids in tall oil in a single crystallization without the precipitation of any substantial amount of the fatty acids. Further objects and advantages will appear as the specification proceeds.

During the experimental work leading to the present invention it was discovered that the above objects can be substantially achieved by employing acetonitrile containing a critical amount of water as the crystallization solvent. More specifically, it has been discovered that a substantially complete precipitation of the resin acids can be obtained while leaving substantially all of the fatty acids in solution by mixing a tall oil stock at room temperature with a sufficient amount of acetonitrile containing a critical amount of water to dissolve the fatty acids.

The starting material for use in the process of this invention can be either refined tall oil, substantially free of unsaponifiables, or crude tall oil containing the unsaponifiables. Preferably, refined tall oil is employed, since it has been found that the presence of unsaponifiables tends to make the crystallization of the resin acids somewhat more difficult. As indicated above, the acids in tall oil can be readily separated from the unsaponifiables by vacuum distillation, and refined tall oil substantially free of unsaponifiables is readily available on the market. For the purpose of the following specification and claims, the term "tall oil" will be used to refer to both crude and refined tall oil, while the terms "crude tall oil" and "refined tall oil" will be used to refer respectively to tall oil containing a substantial amount of unsaponifiables and tall oil substantially free of unsaponifiables.

The crystallization solvent for use in the process of this invention is acetonitrile containing a critical amount of water. A fairly satisfactory separation of the resin acids from the fatty acids in tall oil can be obtained by employing acetonitrile containing from 5 to 25% by weight of water. Preferably, however, the acetonitrile should contain from 15 to 22% by weight of water, and optimum results are obtained when the acetonitrile contains from about 19 to 21% by weight of water.

In general, sufficient aqueous acetonitrile should be employed to dissolve the fatty acids at the temperature at which the crystallization is to be carried out. Ordinarily, at least 1 part by weight of aqueous acetonitrile to each part by weight of tall oil should be employed, and up to 10 parts by weight of aqueous acetonitrile to each part of tall oil can be used. Preferably, however, a minimum amount of solvent should be employed consistent with obtaining a good separation in which the amount of fatty acid precipitated or entrained is reduced to a minimum. It will generally not be necessary to employ more than about 5 parts by weight of aqueous acetonitrile to each part of tall oil. Excellent results are obtained by using from about 2 to 4 parts by weight of aqueous acetonitrile to each part by weight of tall oil.

The use of aqueous acetonitrile in carrying out a solvent crystallization process for the separation of resin acids from the fatty acids in tall oil permits the use of a very simple procedure. In general, all that is required is that the aqueous acetonitrile be mixed with the tall oil at room temperature (20 to 25° C.) until the resin acids precipitate. In the absence of unsaponifiables, that is when employing refined tall oil, the precipitation will be relatively rapid. It will be apparent of course that it is immaterial whether the water is combined with the acetonitrile before addition of the solvent to the tall oil or whether the solvent is formed in situ by the separate addition of water and acetonitrile to the tall oil. This relatively simple procedure permits a more efficient separation of the resin acids from the fatty acids in tall oil than any process which has heretofore been known. Neither heating nor refrigeration are required in carrying out the crystallization process, and substantially pure resin and fatty acids can be obtained in a single crystallization. For example, by merely mixing from 2 to 4 parts by weight of aqueous acetonitrile containing 20% water by weight with each part of refined tall oil, 99% or more of the resin acids will be precipitated, while leaving 99% or more of the fatty acids in solution.

The precipitated resin acids can easily be separated from the supernatant containing the dissolved fatty acids by filtration or other suitable separation procedure. The residual solvent in the separated crystallized resin acids can be removed by evaporation, for example, by tray drying. The fatty acids in the filtrate can easily be recovered by sending the filtrate to a steam-heated stripping still in which the solvent is removed.

All of the steps up to the stripping of the solvent from the dissolved fatty acids and the evaporation of the residual solvent from the crystallized resin acids, can be carried out at room temperature, that is, between about 20 to 25° C. Heating and cooling of the crystallization mixture can be employed, but since it has not been found to improve the cleanness of the separation or to otherwise facilitate the crystallization, there is no particular reason for doing so. Either the heating or refrigeration of large volumes of solvent such as would be employed in carrying out the process of this invention on a commercial basis would greatly increase the cost of carrying out the process. Since such steps are unnecessary, it can be seen that this constitutes a striking advantage of the present process.

The theoretical basis of the process of this invention has been extensively investigated. It is believed that the surprising advantage of aqueous acetonitrile over all other known solvents for the separation of resin acids from fatty acids in tall oil is due to the preferential solubilization of the unsaturated fatty acids in tall oil (oleic and linoleic). This phenomenon can best be appreciated by reference to the phase diagrams set out in the accompanying drawings, in which—

Fig. 1 shows the solubility of pure tall oil fatty acids, pure tall oil resin acids, and representative mixtures of tall oil resin and fatty acids in anhydrous acetonitrile; Fig. 2, the solubility curves of the same materials shown in Fig. 1 in acetonitrile containing 5% water by weight; Fig. 3, the solubility curves of the same materials in acetonitrile containing 10% water by weight; Fig. 4, the solubility curves of the materials in acetonitrile containing 15% water; Fig. 5, the solubility curves of the materials in acetonitrile containing 20% water; Fig. 6, the solubility curves of the materials in acetonitrile containing 22% water; and Fig. 7, the solubility curves of the materials in acetonitrile containing 25% water.

As indicated above, the basic principle upon which this process operates is the selective solubilization of the unsaturated tall oil fatty acids in the presence of tall oil resin acids by the addition of a critical amount of water to the acetonitrile used as the solvent. The phase diagrams shown in Figs. 1 to 7 indicate in general that the degree of separation of the tall oil acids is quite critically dependent upon the amount of added water. The reasons for this can be understood by reference to the solubility curves of the phase diagrams. These diagrams (Figs. 1 to 7) represent the solubility in weight percent plotted against the temperature for acid mixtures containing different amounts of resin acids, 42 and 66% being representative of tall oils containing lesser and greater proportions of resin acids, respectively, and the uppermost and lowermost curves showing the solubility of the pure resin and fatty acid components, respectively.

Fig. 1 illustrates the solubility of the materials in anhydrous acetonitrile, and Fig. 2 illustrates the unusual phenomenon resulting from the addition of as little as 5% water by weight to the acetonitrile. The pronounced depression of the immiscible liquid phase region of the unsaturated fatty acids, as shown in Fig. 5, amounts to a tremendous increase in the solubility of the fatty acids. As shown in Figs. 2 to 7, the immiscible liquid phase region of the unsaturated fatty acids remains depressed throughout the range of 5 to 25% water in the acetonitrile. However, as shown in Fig. 6, at about 22% water the solubility curves begin to revert to solubility conditions similar to those in anhydrous acetonitrile. At a concentration of 25% water as illustrated in Fig. 7, the presence of water becomes of little value in modifying the system to increase the solubility of the unsaturated fatty acids. Therefore, the desired effect of increasing the solubility of the fatty acids occurs within the range 5 to 25% water.

The system of aqueous acetonitrile and tall oil acids displays the further property that the addition of water also has a solubilizing effect on the resin acids. This is indicated by the shift in the solubility curves for the 42%, 66% and 100% resin acids from Fig. 1 to Fig. 2. However, the solubilizing effect of the water reaches a maximum and the solubility of the resin acids begins to revert to their anhydrous acetonitrile solubility considerably before the reversion of the fatty acids to their anhydrous acetonitrile solubility. The phase diagrams indicate that the maximum solubilizing effect of water on the resin acids is obtained in the neighborhood of 10% water which is the condition shown in Fig. 3 of the drawing. As the weight percent of water is increased above 10%, the solubility of the resin acids rapidly decreases until at about 15% water (Fig. 4) the solubility of the resin acids has reverted to a condition approaching that in anhydrous acetonitrile. Over the range of 15 to 22% water, as shown in Figs. 4 to 6, the water has a highly effective solubilizing effect on the fatty acids while having very little solubilizing effect on the resin acids. Therefore, this range is preferred, as previously indicated. The optimum conditions for obtaining the most efficient separation between the resin and fatty acids are in the neighborhood of 20% water, as indicated in Fig. 5. Therefore, the optimum range is approximately 19 to 21% water.

In order to more fully illustrate the present invention, it is desired to set out the following specific examples.

Example I 11.45 g. of distilled tall oil containing 42% resin acids were stirred at room temperature (24° C.) with 34.35 g. of acetonitrile containing 20% water until thoroughly admixed. The precipitated material was removed by filtration and the solvent was stripped under vacuum from both the precipitate and filtrate fractions. The precipitate weighed 4.83 g., amounting to 42.2% of the feedstock and consisting of about 99% resin acids. The filtrate weighed 6.61 g., amounting to 57.8% of the feedstock and consisting of approximately 99% fatty acids.

Example II 10.52 g. of the tall oil of Example I were stirred at room temperature with 21.04 g. of acetonitrile containing 20% water until thoroughly admixed. After filtration and stripping the solvent from the fractions under vacuum, the precipitate weighed 4.44 g., amounting to 42.2% of the feedstock and consisting of about 99% resin acids. The filtrate weighed 6.08 g., amounting to 57.8% of the feedstock and consisting of about 99% fatty acids.

These two examples demonstrate that the efficiency of the separation is not dependent upon the concentration of tall oil in the range of normal plant operations.

Example III 10.97 g. of distilled tall oil containing 57% resin acids were stirred at room temperature with 21.94 g. of acetonitrile containing 20% water until thoroughly admixed. After removal of the precipitate by filtration, the solvent was stripped from the respective fractions under vacuum. The precipitate weighed 6.27 g., amounting to 57.2% of the feedstock, and consisted of about 99% resin acids. The filtrate weighed 4.69 g., amounting to 42.8% of the feedstock, and consisted of about 99% fatty acids.

Example IV 12.56 g. of Neo-Fat D-242, a commercial distilled tall oil acid mixture containing 66.0% resin acids, were stirred at room temperature with 37.68 g. of acetonitrile containing 20% water until thoroughly admixed. After filtering and stripping the fractions obtained, the precipitate weighed 8.32 g., amounting to 66.2% of the feedstock and consisting of about 99% resin acids. The filtrate weighed 4.24 g., amounting to 33.3% of the feedstock and consisting of about 99% fatty acids.

Example V

One part distilled tall oil acids containing 66% resin acids were stirred for 5 minutes at room temperature (25° C.) with three parts of acetonitrile containing 20% water. After being allowed to crystallize at room temperature for 24 hours, the precipitate was removed from the mixture by filtration, and the solvent was removed from the precipitate and filtrate by evaporation under vacuum at 70° C. The precipitate amounted to 66.2% of the original acid mixture and consisted of about 99% resin acids. The residue obtained from the filtrate amounted to 33.8% of the original material and consisted of abount 99% unsaturated fatty acids.

In the foregoing discussion, the application of the process of this invention for separating tall oil fatty acids from tall oil resin acids has been emphasized because tall oil is the most important commercial source of mixtures of resin and unsaturated fatty acids. However, the process of this invention is applicable to the separation of any mixtures of resin acids from unsaturated fatty acids containing 18 carbon atoms.

Although this invention has been described in connection with certain specific embodiments, it will be apparent to those skilled in the art that modifications and changes can be made without departing from the spirit and scope of the invention.

We claim:

1. In a process for separating the resin acid components of tall oil from the fatty acid components therein, the step of mixing said tall oil with aqueous acetonitrile to precipitate the bulk of said resin acids while leaving the bulk of said fatty acids in solution, said aqueous acetonitrile being from 5 to 25% water by weight.

2. In a process for separating resin acids from a mixture of tall oil resin acids and tall oil fatty acids substantially free of unsaponifiable material, the step of mixing said mixture with aqueous acetonitrile to precipitate the bulk of said resin acids while leaving the bulk of said fatty acids in solution, said aqueous acetonitrile being from 5 to 25% water by weight.

3. In a process for separating the resin acid components of tall oil from the fatty acid components, the step of mixing said tall oil with aqueous acetonitrile to precipitate the bulk of said resin acids while leaving the bulk of said fatty acids in solution, said aqueous acetonitrile being from 15 to 22% water by weight.

4. In a process for separating the resin acid components of tall oil from the fatty acid components therein, the step of mixing said tall oil with aqueous acetonitrile to precipitate the bulk of said resin acids while leaving the bulk of said fatty acids in solution, said aqueous acetonitrile being from 19 to 21% water by weight.

5. In a process for separating resin acids from a mixture of tall oil resin acids and tall oil fatty acids substantially free of unsaponifiable material, the step of mixing said mixture with aqueous acetonitrile to precipitate the bulk of said resin acids while leaving the bulk of said fatty acids in solution, said aqueous acetonitrile being from 15 to 22% water by weight.

6. In a process for separating resin acids from a mixture of tall oil resin acids and tall oil fatty acids substantially free of unsaponifiable material, the step of mixing said mixture with aqueous acetonitrile to precipitate the bulk of said resin acids while leaving the bulk of said fatty acids in solution, said aqueous acetonitrile being from 19 to 21% water by weight.

7. In a process for separating the resin acid components of tall oil from the fatty acid components therein, the step of mixing from 1 to 10 parts by weight of aqueous acetonitrile with each part by weight of said tall oil to precipitate the bulk of said resin acids while leaving the bulk of said fatty acids in solution, said aqueous acetonitrile being from 5 to 25% water by weight.

8. In a process for separating the resin acid components of tall oil from the fatty acid components therein, the step of mixing from 1 to 5 parts by weight of aqueous acetonitrile with each part by weight of said tall oil to precipitate the bulk of said resin acids while leaving the bulk of said fatty acids in solution, said aqueous acetonitrile being from 15 to 22% water by weight.

9. In a process for separating the resin acid components of tall oil from the fatty acid components therein, the step of mixing from 2 to 4 parts by weight of aqueous acetonitrile with each part by weight of said tall oil to precipitate the bulk of said resin acids while leaving the bulk of said fatty acids in solution, said aqueous acetonitrile being from 19 to 21% water by weight.

10. In a process for separating resin acids from a mixture of tall oil resin acids and tall oil fatty acids substantially free of unsaponifiable material, the step of mixing from 1 to 5 parts of aqueous acetonitrile with each part of said mixture to precipitate substantially all of said resin acids while leaving substantially all of said fatty acids in solution, said aqueous acetonitrile being from 15 to 22% water by weight.

11. In a process for separating resin acids from a mixture of tall oil resin acids and tall oil fatty acids substantially free of unsaponifiable material, the step of mixing from 2 to 4 parts of aqueous acetonitrile with each part of said mixture to precipitate substantially all of said resin acids while leaving substantially all of said fatty acids in solution, said aqueous acetonitrile being from 19 to 21% water by weight.

JAMES HARWOOD.
CHARLES W. HOERR.
RICHARD A. RECK.

No references cited.